United States Patent
Bammel

(10) Patent No.: US 6,723,765 B2
(45) Date of Patent: Apr. 20, 2004

(54) AUTODEPOSITED COATING OF EPOXY AND OH GROUPS-CONTAINING RESIN WITH NCO LOWER T CROSSLINKER AND HIGHER T CROSSLINKER

(75) Inventor: Brian D. Bammel, Rochester Hills, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 10/339,823

(22) Filed: Jan. 10, 2003

(65) Prior Publication Data

US 2003/0143405 A1 Jul. 31, 2003

Related U.S. Application Data

(62) Division of application No. 09/944,267, filed on Aug. 31, 2001, now Pat. No. 6,525,112.

(51) Int. Cl.[7] ............... C08K 3/20; C08G 59/42; C08G 59/46; C08G 59/56; C08G 59/62
(52) U.S. Cl. ............... 523/415; 523/404; 525/504; 525/524; 525/528
(58) Field of Search .................... 523/404, 415; 525/504, 524, 528; 428/418; 427/386

(56) References Cited

PUBLICATIONS

Chemical abstracts registry No. 1999:375294 for European Patent No. 921,140, Jun. 9, 1999.*

* cited by examiner

*Primary Examiner*—Robert Sellers
(74) *Attorney, Agent, or Firm*—Stephen D. Harper; Mary K. Cameron

(57) ABSTRACT

Autodeposition compositions for polymeric coatings of reduced gloss are prepared using resins having at least one hydroxy group and at least one epoxy group per molecule, a low temperature crosslinker and a high temperature crosslinker. The low temperature crosslinker forms a reactive prepolymer that may be subsequently mixed or emulsified with a high temperature crosslinker to form an autodeposition composition. Alternatively, a hybrid crosslinking agent may be utilized which contains both free isocyanate groups reactive at a relatively low temperature with the resin and at least one functional group capable of reacting with the resin only at a relatively elevated temperature. When deposited and cured, the resulting coating has a matte finish that is resistant to surface defects.

31 Claims, No Drawings

AUTODEPOSITED COATING OF EPOXY AND OH GROUPS-CONTAINING RESIN WITH NCO LOWER T CROSSLINKER AND HIGHER T CROSSLINKER

This application is a division of U.S. Ser. No. 09/944,267, filed Aug. 31, 2001 U.S. Pat. No. 6,525,112.

FIELD OF THE INVENTION

The invention relates to autodeposition coating compositions based on epoxy resins and the use of such compositions to form autodeposited coatings on metallic substrates.

BACKGROUND OF THE INVENTION

Autodeposition has been in commercial use on steel for about thirty years and is now well established for that use. For details, see for example, U.S. Pat. Nos. 3,592,699 (Steinbrecher et al); 4,108,817 and 4,178,400 (both to Lochel); 4,180,603 (Howell. Jr.); 4,242,379 and 4,243,704 (both to Hall et al.); 4,289,826 (Howell, Jr.); and 5,342,694 (Ahmed) as well as U.S. Pat. No. 5,500,460 (Ahmed et al.). The disclosures of all of these patents are hereby incorporated by reference.

Autodeposition compositions are usually in the form of liquid, usually aqueous, solutions, emulsions or dispersions in which active metal surfaces of inserted objects are coated with an adherent resin or polymer film that increases in thickness the longer the metal object remains in the bath, even though the liquid is stable for a long time against spontaneous precipitation or flocculation of any resin or polymer, in the absence of contact with active metal. "Active metal" is defined as metal that spontaneously begins to dissolve at a substantial rate when introduced into the liquid solution or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods, or a like term. Autodeposition is often contrasted with electrodeposition, which can produce very similar adherent films but requires that metal or other objects to be coated be connected to a source of direct current electricity for coating to occur. No such external electric current is used in autodeposition.

One way in which autodeposition coatings have traditionally been prepared is by emulsifying a mixture containing an epoxy resin, a crosslinker, any optional additives and a solvent. The emulsified mixture is then subjected to distillation to remove solvent, resulting in the formation of an autodeposition composition made of resinous particles dispersed in water. When used in an autodeposition process, the composition when cured forms a polymeric coating of high gloss. Unfortunately, such coatings are sensitive to coating defects such as craters and edge pullback and other defects caused by the presence of particulate matter on the substrate surface.

It would be desirable to have a composition and method of use that would form an autodeposition coating that is more resistant to pinholes, blemishes and other forms of surface defects, particularly on zinciferous surfaces, more particularly galvanized steel or some variation.

Additionally, conventional epoxy resin based autodeposition compositions typically produce a glossy surface film when cured. Not every end user of this technology, however, desires a gloss surface. Additional processing steps or additives are generally needed to convert a conventional glossy coating to a matte or semi-gloss surface, but it would be preferable to avoid the need to use such additional steps or additives.

SUMMARY OF THE INVENTION

It is an object of the invention to provide an autodeposition coating composition that is resistant to surface defects, including cratering, edge pullback, and defects caused by the presence of particulate matter.

It is another object of the invention to provide an autodeposition process that forms an autodeposited coating, when cured, of reduced gloss.

In accordance with these and other objects of the invention, an autodeposition composition according to the invention comprises, preferably in emulsion or dispersion form, (a) a crosslinkable reaction product made by the reaction at a first temperature of a resin containing both reactive hydroxyl groups and reactive epoxide groups and a reactive first crosslinking agent containing free isocyanate groups; and (b) a second crosslinking agent that is reactive with said reaction product only at a second higher temperature. The second temperature is preferably at least 50° C. greater than the first temperature, more preferably at least 75° C. greater than the first temperature. Hybrid crosslinking agents may also be used which have both free isocyanate groups and moieties capable of reacting with hydroxy and/or epoxy groups only at elevated temperature, thereby serving the function of both the aforedescribed first and second crosslinking agents.

The autodeposition composition of the invention can be used to form a reduced-gloss resinous film that is durable and resistant to defects due to cratering, edge pullback, and the presence of particulate matter on the treated surface. Such an autodeposition composition can provide manufacturers of metal goods with a durable, corrosion resistant surface for use with or without additional coatings, paints, and the like.

DETAILED DESCRIPTION

The autodeposition composition and method of use according to the invention are based on resins that contain within the same molecule: (i) one or more epoxide groups as well as (ii) one or more hydroxyl groups that are reactive with free isocyanate groups at ambient to slightly elevated temperatures. The use of both types of functionalities allows the formation of a reactive prepolymer component of increased molecular weight relative to the starting resin component through preliminary reaction of the hydroxyl groups in a low temperature reaction with a first crosslinking agent. In one embodiment of the invention, this reactive prepolymer is mixed or emulsified with a second crosslinking agent (which contains functional groups capable of reacting with the prepolymer only at elevated temperatures) and used to form an autodeposited resin coating under autodeposition conditions, which is then cured by heating. In another embodiment of the invention, a hybrid crosslinking agent is employed which has characteristics of both the first crosslinking agent and second crosslinking agent. The elevated temperatures in the curing step induce crosslinking reactions between the reactive prepolymer and second crosslinking agent (or between individual molecules of the reactive prepolymer where a hybrid crosslinking agent is used), thereby forming an autodeposited coating of reduced gloss which is resistant to minor defects in surface cleaning and which also exhibits low shrinkage and edge pullback.

Resins

The reactive prepolymers useful in the present invention can be based on one or more epoxy resins which contain one or more hydroxyl groups that are reactive to isocyanate groups. Such epoxy resins are well known substances and are described, for example, in the chapter entitled "Epoxy Resins" in Volume 6 of The Encyclopedia of Polymer Science and Engineering (Second Edition). Preferably, the epoxy resin used contains one or more hydroxyl groups (for low temperature reactivity) and approximately two epoxide groups per molecule.

Epoxy resins are often described by the type of central organic moiety or moieties to which the 1,2-epoxy moieties are attached. Non-exclusive examples of such central moieties are those derived from bisphenol A, bisphenol F and their analogs in which one or two $—NH_2$ moieties are substituted for an equal number of $—OH$ moieties in the bisphenol; novolak condensates of formaldehyde with phenol and substituted phenols and their amino analogs, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy resin. Optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Epoxy resins useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy resins derived from bisphenol A in this invention. More particularly, epoxy moiety containing molecules utilized in this invention preferably conform to the general chemical formula:

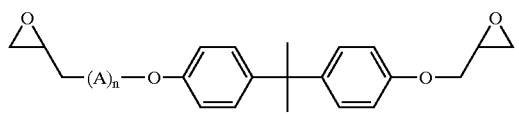

where:

A =

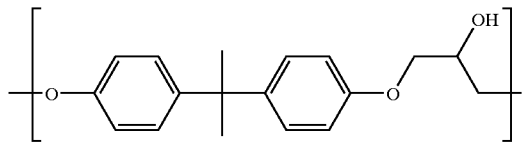

and "n" is an integer from 0 to 50. If such epoxy resins are to be used directly as the resin component of the present invention, n is preferably an integer within the range from about 1–30 so that each molecule contains at least one hydroxyl group. Commercially available epoxy resins of this type are normally mixtures of molecules having somewhat different n values and different numbers of epoxy groups. Preferably, the epoxy resin mixture used has a number average molecular weight in the range of from about 350 to about 5,000, more preferably in the range from about 400 to about 3000. Preferably, the average number of epoxide groups per molecule in the epoxy resin mixture is in the range from 1.7 to 2.5, more preferably in the range from 1.9 to 2.1. The epoxy resin mixture may contain resin molecules in which n=0.

Particularly useful as the resin component of the present invention are chain-extended epoxy resins, such as those described in application Ser. No. 09/578,935, filed on May 25, 2000, abandoned, the disclosure of which is herein incorporated by reference in its entirety.

In chain-extended resins, a chain extender is utilized to react individual epoxy resin molecules through their epoxy groups so as to form a polymer which is higher in average molecular weight than the starting epoxy resin(s). In this embodiment of the invention, the starting epoxy resin(s) may have a relatively low epoxide equivalent weight (e.g., from about 75 to about 400). Glyadyl ethers of bisphenol A are particularly preferred for use as the starting epoxy resin. For reasons that are not well understood, "prereacting" the epoxy resin(s) in this manner leads to improvements in the quality and performance of the final autodeposited coating as compared to simply using a dispersion of the epoxy resin(s) in unreacted form. This is particularly true where at least one of the epoxy resins is a flexibilizing epoxy resin.

A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups capable of increasing the flexibility of the cured autodeposited coating such as, for example, long aliphatic chains (e.g., polymethylene chains corresponding, for example, to the structure $—(CH_2)_n—$ wherein "n" is preferably greater than 3, more preferably greater than 6. The polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure $((CH_2)n—CHR—O—)m-$, where: "n" is 0–3, "m" is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350.

In one embodiment of the invention, the average molecular weight is increased through chain extension at least 100%, more preferably at least about 200%, relative to the initial average molecular weight of the starting epoxy resin or combination of epoxy resins. The chain extender thus should contain at least two functional groups capable of reacting with said epoxy group such as, for example, hydroxy, carboxylic acid, carboxylic acid anhydride or the like. In one embodiment of the invention, the chain extender is a polyhydric phenol such as bisphenol A. Alkoxylated polyhydric phenols such as SYNFAC 8009 (available from Milliken Chemical) may also be used as chain extenders. Suitable chain extenders additionally include dicarboxylic acids such as adipic acid.

In one embodiment of the invention a diglycidyl ether of a polyhydric phenol such as bisphenol A is used in combination with a chain extender which contains one or more flexibilizing segments such as polymethylene, polyester or polyoxyalkylene segments. For example, a polyether polyol such as polypropylene glycol, polyester polyol (hydroxy and/or carboxylic acid terminated), dimer fatty acid, long chain dicarboxylic acid (e.g., decanedioic acid), long chain diol (e.g., 1,12-decanediol), or the like could be used.

The stoichiometry of chain extender(s) to epoxy resin(s) is adjusted depending upon the degree of condensation (i.e., chain extension) desired in the reaction product which is to be used as the resin component in the autodeposition coating of the present invention. Typically, however, the amount of epoxy resin(s) is kept in slight to moderate excess relative to the amount of chain extender(s). For example, the equivalents of epoxy groups in the epoxy resin(s) may be about 5% to about 50% greater than the equivalents of active hydrogen groups in the chain extender(s). The reaction product formed thus will contain unreacted epoxy groups (i.e., the reaction product will be epoxy-functionalized). The reaction product will also contain hydroxy (—OH) groups, which may be present in the initial epoxy resin(s) or which may be formed as a consequence of the reaction between the chain extender and the epoxy groups of the epoxy resin.

The epoxy resin(s) and chain extender(s) are reacted for a time and at a temperature effective to cause the desired degree of condensation and chain extension. In one embodiment of the invention, for example, the epoxide equivalent weight of the reaction product formed will be in the range of at least about 1000, preferably at least about 1500, as compared to epoxide equivalent weights for the starting epoxy resin reactant(s) of from about 75 to about 400. Such conditions will vary depending upon the relative reactivities of the components and other factors, but may be optimized without undue experimentation.

Catalysts capable of accelerating the desired epoxy group reaction with the chain extender such as phosphines, amines and other basic substances may be utilized if so desired in order to reduce the reaction time and/or temperature required. The reaction may be carried out in the presence of a solvent capable of dissolving both the epoxy resin(s) and the chain extender(s) such as, for example, an inert organic solvent (e.g., aromatic hydrocarbons, ketones). It is recognized that in certain embodiments of the invention, some portions of the starting materials may remain unreacted and thus may be present in such form when the reaction product is used in the autodeposition composition described herein.

In one desirable embodiment of the invention, the reaction product derived from the epoxy resin(s) and chain extender(s) is prepared prior to forming an emulsion of said reaction product in water. A solution of the reaction product in one or more organic solvents is emulsified with water in the presence of one or more emulsifiers to form an organic solvent-containing intermediate emulsion. The organic solvent(s) used in said emulsification step may be the same as or different from the organic solvent(s) used when reacting the epoxy resin(s) and chain extender(s). Other desired components such as cross-linkers, coalescing agents, flow control additives (leveling agents), and the like may also be incorporated into the emulsion, either as components pre-dissolved in the organic (solvent) phase or added separately to the emulsion. Preferably, the organic solvent is subsequently removed from the emulsion by distillation or similar method.

Low Temperature Crosslinker

As noted above, a resin containing both hydroxyl and epoxide groups preferably is reacted at ambient to slightly elevated temperatures with a first crosslinking agent. The first crosslinking agent reacts with the hydroxyl groups to increase the molecular weight of the resin without unduly affecting the ability of the reactive prepolymer thereby obtained to cure into a durable continuous film when heated at an elevated temperature. Thus, in preferred embodiments of the invention, the NCO:OH ratio is less than about 1 and more preferably less than about 0.5 so that some unreacted hydroxyl groups are still present in the reactive prepolymer.

Agents useful as the first crosslinking agent for the invention preferably contain at least two free isocyanate groups per molecule that can react with hydroxyl groups on the epoxy resin at temperatures of less than 100° C. e.g., within the range of 15° C. to about 90° C., more preferably within the range from about 15° C. to about 80° C., and most preferably within the range of 18° C. to 25° C. Examples of suitable low temperature cross-linkers for use in the present invention include aliphatic and aromatic polyisocyanates. Diisocyanates are particularly preferred, with MDI, TDI, HMDI, isophorone diisocyanate, cyclohexane diisocyanate, and the like being especially preferred.

If desired, one or more catalysts can be added to facilitate the low temperature reaction between the resin and the low temperature crosslinker(s) that are needed to form the reactive prepolymer. Examples of suitable catalysts are those that are known catalysts for the acceleration of the isocyanate/hydroxyl reaction such as soluble metallic catalysts and salts thereof. Preferred catalysts for the low temperature crosslinking step include zinc acetyl acetonate, stannoxanes such as octaalkylstannoxane, dibutyltin dilaurate, zinc acetyl acetate, and dialkyltin oxides such as dibutyl tin oxide.

Reaction of the low temperature crosslinking agent and the resin forms a reactive prepolymer. At least a portion of the reactive prepolymer comprises a condensation product produced by reaction of a single low temperature crosslinker molecule with at least two molecules of the resin containing both hydroxyl and epoxide groups. This prepolymer thus has a higher number average molecular weight than the original resin but remains capable of reacting at elevated temperatures with the second crosslinking agent. While not wishing to be bound by theory, it is believed that the condensation of the low temperature crosslinking agent and resin increases the viscosity of the formulation and, thereby, its resistance to flow. This change provides an autodeposition composition that manifests itself in a finish of reduced gloss as well as good edge coverage, low cratering, and resistance to particulate impurities.

High Temperature Crosslinker

The second crosslinking agent used in the present invention reacts with epoxide or hydroxyl moieties on the reactive prepolymer only at the elevated temperatures found in the curing stage of the process, e.g., at least 100° C. The preferred high temperature crosslinking agents are believed to be reactive with hydroxyl groups as well as with any intact epoxide groups that may still be present in relative prepolymer once it has been placed in the relatively acidic environment of an autodeposition bath composition. Most, or all, of such epoxide groups are believed likely to be hydrolyzed to produce hydroxyl groups. Furthermore, even if epoxy groups remain as such, there will normally be at least some hydroxyl groups available for crosslinking reactions such as esterification, etherification, and urethane formation.

High temperature crosslinking agents are preferably molecules that are capable of rapid chemical addition reactions with epoxy and/or hydroxyl only when heated, but which exhibit little or no reactivity towards such moieties at temperatures less than 100° C. Such crosslinking agents are sometimes referred to in the art as latent curatives. Examples of suitable high temperature crosslinking agents include (a) molecules that contain: at least two epoxy and/or hydroxyl-reactive functional groups, such as amine, amide, imine, thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. Examples of such blocked isocyanates are described in U.S. Pat. Nos. 5,500,460 and 6,096,806, the disclosures of which are herein incorporated by reference in their entirety.

Briefly described, the blocked isocyanates of U.S. Pat. Nos. 5,500,460 and 6,096,806 are chosen from molecules that conform to general formula:

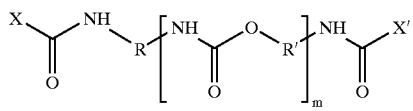

wherein:
  each of X and X' independently is a monovalent moiety formed by removing the most easily ionized hydrogen atom from an amine, alcohol, amide, or oxime molecule, or B and B' are joined to each other to form a uretdione;
  each of R and R' independently is a divalent hydrocarbon or carbonyl hydrocarbon moiety derived by removing from any hydrocarbon, or from an oxyhydrocarbon in which all oxygen atoms present are in carbonyl groups, any two hydrogen atoms not attached to the same carbon atom, said divalent
  hydrocarbon or carbonyl-hydrocarbon moiety having from 2 to 20 carbon atoms and having no unsaturation except aromatic and carbonyl unsaturation; and
  m is an integer from 0–20, preferably, within the range of 1–15.

The blocking groups X and X', which preferably are the same or are joined to form a uretdione, can be derived from any suitable aliphatic, cycloaliphatic, aromatic, or alkylaromatic monoalcohol, monoamide, monoamine, or monooxime. Ketoximes are especially useful when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C.

The use of isophorone diisocyanate-based, epsilon-caprolactam blocked isocyanates as crosslinker, such as the product sold by Huels under the trademark VESTAGON B 1530, is particularly preferred. If a blocked isocyanate-type crosslinker is utilized, the ratio of blocked isocyanate groups to hydroxy groups (NCO:OH) typically will be in the range of about 0.05 to about 1.2, more preferably about 0.1 to about 0.5. Other examples include blocked hexamethylene diisocyanates (HMDI).

Hybrid Cross-linkers A particularly preferred crosslinker for the present invention is a hybrid crosslinking agent which contains, in the same molecule, both at least two free isocyanate groups capable of reacting with hydroxy groups in the resin at a first relatively low temperature (e.g., less than 100° C.) as well as at least one functional group (and preferably at least two functional groups) capable of reacting with the resin only at a second relatively high temperature (e.g., in excess of 100° C., preferably a temperature that is at least 50° C. greater than the first temperature). The aforementioned functional group may be an amine, amide, imine, thiol, hydroxyl, carboxyl, carboxylic acid anhydride, or (most preferably) a blocked isocyanate group capable of reacting with epoxy or hydroxy groups only at temperatures above 100° C. One such crosslinker has the general structure of:

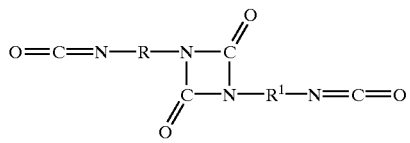

wherein:
  R and R' are independently selected from aliphatic, cycloaliphatic, aromatic, or alkylaromatic radicals having from 1–20 carbon atoms. Cross-linkers of this type are available from commercial sources including, for example, DESMODUR N3400 (an isocyanate-containing uretdione of hexamethylene diisocyanate, sold by Bayer Corporation). Dimers of other diisocyanates are also suitable for use. Methods of synthesizing polyisocyanate-containing uretdiones are described, for example, in U.S. Pat. No. 4,929,724 (incorporated herein by reference in its entirety). Other types of hybrid crosslinking agents which could be used in the present invention include, but are not limited to, urethane group-containing polyisocyanates, isocyanurate group-containing polyisocyanates, biuret group-containing polyisocyanates, allophanate group-containing polyisocyanates, carbodiimide group-containing polyisocyanates and the like. The hybrid crosslinker may be used either as the sole crosslinking agent in the autodeposition composition or in combination with a low temperature crosslinker and/or a high temperature crosslinker.

The reaction of the hybrid crosslinker and the resin containing both hydroxyl and epoxide groups is carried out under conditions similar to those described above in connection with the lower temperature crosslinker. Such conditions are selected so as to provide a reactive prepolymer having a number average molecular weight greater than that of the starting resin and containing at least a fraction of species produced by reaction of a hybrid crosslinker molecule with at least two resin molecules.

Optional Ingredients

An autodeposition composition employed in the present invention may also contain a number of additional ingredients that are added before, during or after the formation of the reactive prepolymer. Such additional materials include surfactants or emulsifying agents (preferably anionic), accelerators for the autodeposition reaction, fillers, biocides, foam control agents, flow control or leveling agents, pigments, and/or colorants. If desired, one or more coalescing agents such as trialkylpentanediol isobutyrate, alkylcarbitol, or, the like can be used to lower the film-forming temperature and facilitate the coalescence of the deposited resin particles. Unreacted epoxy resin (i.e., epoxy resin that has not been reacted with the low temperature or hybrid crosslinking agent) may also present as may resins and polymers other than epoxy-type or epoxy-based resins. The concentrations of these various components may be selected in accordance with the concentrations of corresponding components used in conventional epoxy resin-based autodeposition compositions, such as those described in U.S. Pat. Nos. 5,500,460 and 6,096,806 and U.S. Ser. No. 09/578,935.

It is particularly preferred for the autodeposition compositions of the invention to be in dispersed form, i.e., with the reactive prepolymer or reaction product of the resin and one or more crosslinking agents to be dispersed in fine particle form in an aqueous medium. Preferably, such particles have an average particle diameter of less than 300 nm (more preferably, from 100 to 250 nm). Surfactants may be used to assist in the formation and stabilization of such dispersions. The dispersions of the present invention may be prepared using the processing techniques generally described in U.S. Pat. No. 6,096,806 (incorporated herein by reference in its entirety), wherein a two stage process is employed in which a preliminary dispersion formed in the first stage is forced through a narrow aperture in a second stage.

Preferred anionic surfactants for use in the present invention are ether sulfates that conform to general formula:

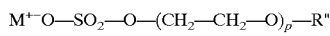

wherein:

M represents a monovalent cation or monovalent fraction of cation of higher valence, preferably sodium or ammonium, more preferably ammonium;

p is a positive integer that preferably is at least, with increasing preference in the order given, 2, 3, or 4; and R" represents an alkyl or alkylaryl moiety, more preferably an alkyl phenol moiety. Independently, R" preferably has 8–30 and preferably has 15–20 carbon atoms. Suitable commercially available anionic emulsifiers include DowfaX™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate).

The single most preferred anionic emulsifying agent is Rhodapex™ CO-436, which is reported by its supplier to be an ammonium salt of sulfonated nonylphenol ethoxylate and to contain 58% of this active ingredient. The preferred amount of active anionic emulsifying agent is within the range from about 0.1–5 wt % based on total composition and is preferably within the range from about 1–3 wt %.

The autodeposition accelerator component is a substance such as an acid, oxidizing agent, and/or complexing agent capable of causing the dissolution of active metals from active metal surfaces in contact with the autodeposition composition. The autodeposition accelerator component is preferably chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. More preferably, the accelerator comprises: (a) a total amount of fluoride ions of at least 0.4 g/L, (b) an amount of dissolved trivalent iron atoms that is at least 0.003 g/L, (c) a source of hydrogen ions in an amount sufficient to impart to the autodeposition composition a pH that is at least 1.6 and not more than about 5, and, optionally, (d) hydrogen peroxide. Hydrofluoric acid is preferred as a source for both the fluoride ions as well as the proper pH. Ferric fluoride can supply both fluoride ions as well as dissolved trivalent iron. Accelerators comprised of HF and $FeF_3$ are especially preferred for use in the present invention. The accelerator(s) used should be sufficient in total strength and amount to impart to the autodeposition composition an oxidation-reduction potential that is at least 100 mV more oxidizing than a standard hydrogen electrode.

Pigments, filler components or soluble colorants may generally be selected for compositions according to this invention from materials established as satisfactory for similar uses in other autodepositing liquid compositions. Suitable materials include carbon black, phthalocyanine blue, phthalocyanine green, quinacridone red, hansa yellow, and/or benzidine yellow pigment, and the like.

A solvent may be used as a medium for combining the epoxy resin, crosslinking agent(s), and added components. The solvent component is not believed in most cases to contribute any desirable characteristic to the final autodeposition compositions although it may function as a coalescing agent in some instances. The preferred solvents, however, are not particularly effective coalescing agents when used alone.

The solvent component may be removed from the emulsion by distillation under reduced pressure. However, in many cases the solvents do not diminish the technical benefits of the final autodeposition compositions according to the invention and may be left in place in the autodeposition composition. Any such residual solvent will normally be expelled during the elevated temperatures found in the curing stage at the end of the autodeposition process.

The most preferred solvents are mixtures of (i) aromatic hydrocarbons with from 6 to 10 carbon atoms and (ii) ketones with from 3 to 8 carbon atoms. Preferably, the amount of solvent used to mix the materials is at least 10 wt % of the combined weight of the components without water. The most preferred solvents are toluene and methyl isobutyl ketone (MIBK).

Generally, the presence of a coalescing agent component in an autodeposition composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by antipollution laws in many locations and also have been found to be more likely than monoethers of propylene glycol to destabilize the emulsions formed in products according to the invention, so that monoethers of propylene glycol, particularly the n-butyl and phenyl monoethers of propylene glycol, are preferred from this class. When glycol monoethers are used, their percentage in an autodepositing liquid composition according to the invention preferably is within the range from about 5 to about 30, preferably about 18 to 26% of the total solids in the composition.

Monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethyl-1,3-pentanediol mono 2-methyl propionate. This and other monoesters if used preferably are present in an amount of at least 0.5% of the total autodepositing liquid composition and more preferably are present in amounts of about 1–10, and preferably about 2.5–5%.

Preparation of Reactive Prepolymer

The "prepolymer" may be prepared by mixing one or more of the above-described resins containing epoxy- and hydroxyl-groups with the low temperature crosslinking agent at a first temperature, which preferably is less than 100° C. As noted above, the first temperature is preferably within the range from about 15° C. to about 90° C., more preferably within the range from about 15° C. to about 80° C., and most preferably within the range of about 18° C. to about 25° C. The contact time and conditions should be selected so that the resin and the low temperature crosslinking agent react (as shown by an increase in the molecular weight of the resin) and form the desired "prepolymer" reaction product. Hybrid crosslinking agents may be reacted with the resin under similar conditions. A catalyst may be used to accelerate the isocyanate/resin reaction, including any of the urethane catalysts known in the art such as tin compounds and the like.

Operation of Autodeposition Process

A coating process according to this invention will preferably comprise the steps of: (a) contacting an object with an active metal surface with the aforedescribed autodeposition composition for a sufficient time to cause the formation of a film of the prepolymer (which film may also contain certain other components of the autodeposition bath composition, particularly the high temperature crosslinker if such crosslinker is used) of a predetermined thickness on the metal surface, (b) separating the coated metal surface from contact with the autodeposition bath composition, (c) rinsing the coated metal surface to remove at least some of the absorbed but otherwise unadhered components of the bath composition from the more adherent portion of the coating, and (d) heating the rinsed surface to form a final cured coating. Without wishing to be bound by theory, it is believed that when the wet adherent coating is heated, the prepolymer and high temperature crosslinker present in the dispersion react to form a thermoset polymeric matrix. Where a hybrid crosslinker has been used, the prepolymer molecules react with each other in the curing step.

Ordinarily a metal surface preferably is degreased and rinsed with water before applying an autodeposition composition. Conventional techniques for cleaning and degreasing the metal surface to be treated according to the invention can be used for the present invention. The rinsing with water can be performed by exposure to running water, but will ordinarily by performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns).

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality final films, the corrosion resistance of the cured coating may be further improved by rinsing with an aqueous solution comprising an alkaline earth metal compound such as calcium nitrate as described in copending applications Ser. No. 09/578,935, filed May 25, 2000, and Ser. No. 60/252,799, filed Nov. 22, 2000, and which are incorporated herein by reference in their entirety.

Final heating of the rinsed wet coated and optionally post-treated autodeposited film is preferably at a temperature of greater than 100° C. The curing temperature must be sufficiently high so as to effect reaction of the high temperature crosslinker or reaction of the epoxy-and hydroxyl-reactive functional groups of the hybrid crosslinker residues in the prepolymer with the epoxy and/or hydroxy groups present in the autodeposited film. Generally, the final heating temperature is selected to dry and cure the coating at a temperature within the range from at least about 100° C. to about 300° C., more preferably between about 130° C. and 240° C., for a time of about 3 to about 60 minutes, more preferably for about 10 to about 30 minutes.

The heating can be performed in multiple stages, if desired. For example, in a first stage lasting from about 5 to about 15 minutes, the coated substrate is heated to a peak temperature of about 55° C. to about 65° C. to flash off most of the residual water in the coating and in a second stage lasting from about 30 to about 50 minutes, the coated substrate is heated to a peak temperature of about 175° C. to about 195° C. The peak temperature preferably is attained in preferably, no more than about 10 minutes after the first heating stage has been completed.

Once cooled, the cured film of the present invention will exhibit a smooth matte finish with good coverage at all edges and little or no "pullback" from the coated edges. While not wishing to be bound by theory, it is believed that the higher molecular weight of the reactive "prepolymer" increases the viscosity of the autodeposited resin sufficiently both to bridge minor surface defects and particulates in the deposition process and to remain dimensionally consistent through the post-deposition rinsing and drying/curing processes.

Uses

Autodeposition compositions employed in the present invention can be used for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e,g., filing cabinets, filing shelves, desks, etc.

EXAMPLES 1–12

A series of unpigmented replenisher compositions according to the invention was prepared wherein the isocyanate to hydroxyl ratio (NCO:OH) was varied and different crosslinking agents were employed. Table 1 lists the amounts (in grams) of each component of these replenisher compositions, with the identity of each component used being provided in the footnotes to Table 1.

The replenisher compositions were prepared as follows: Deionized water and surfactant are charged to a clean reaction vessel equipped with a mixer and mixed slowly for 20 minutes or until homogeneous.

A second clean dry reaction vessel equipped with a heavy-duty stirrer and heating, cooling and vacuum distillation capabilities and purged With an inert gas is charged with solvent, the resin solution, high temperature and/or hybrid crosslinking agent, leveling agent, coalescing agent and catalyst. The mixture is heated with stirring to a temperature of 35° C. (±5° C.) and maintained at that temperature for ca. 1 hour or until all the components are dissolved and the mixture is homogeneous. If a low temperature crosslinking agent is to be used, it may be added to the mixture at this point. Addition of a hybrid crosslinking agent may also be performed at this stage of the process.

The contents of the two vessels are pumped according to their proportions and blended in a mixing tank to form a pre-emulsion. The pre-emulsion is then fed using a continuous duty 2 gallon/minute 80 psi discharge feed pump into a micro fluidizer unit equipped with a heat exchanger capable of cooling 2 gallons/minutes below 35° C. The emulsion formed, which preferably has a particle size range of about 150 to about 250 nm, is pumped into a clean, dry distillation vessel.

The contents of the distillation vessel are heated to 38° C. (±2° C.) and a vacuum applied which is sufficient to keep the distillation rate of the methyl isobutyl ketone/water azeotrope constant. Distillation is continued until all of the methyl isobutyl ketone has been removed.

EXAMPLES 13–24

The unpigmented replinisher compositions prepared in Examples 1–12 were modified by the addition of further components as shown in Table 2 to provide pigmented replenisher compositions containing 31.5 wt % non-volatiles.

EXAMPLES 25–36

The pigmented replenisher compositions of Examples 13–24 were formulated into working autodeposition compositions containing an autodeposition accelerator (AUTOPHORETIC C300 Starter, available from the Surface Technologies Division of Henkel Corporation) and deionized water. An initial 675 g portion of deionized water was first charged to the container. The autodeposition accelerator was then added and mixed thoroughly. The desired quantity of replenisher was then added, followed by the remaining quantity of water. The amounts of water, replenisher and autodeposition accelerator used are shown in Table 3.

EXAMPLES 37–45

The working autodeposition compositions described in Example 28–36 were used to autodeposit coatings on ACT cold rolled steel 04×12×026 clean unpolished APR11721 panels. The panels were precleaned by immersion for 120 seconds in AUTOPHORETIC Cleaner 259 (a product of Henkel Surface Technologies). The concentration of the cleaner was 30% by volume (diluted with tap water); the cleaner was maintained at a temperature of 88±6° C. After cleaning, the panels were rinsed for 60 seconds using tap water and deionized water. The cleaned panels were contacted with the autodeposition compositions of Examples 25–36 at room temperature (20–22° C.) for 90 seconds, then withdrawn from the autodeposition compositions. The autodeposition compositions during the coating step were maintained at a redox valve of 300–400 mV (LINEGUARD 101 meter reading=150–300 microamperes). Approximately 30 to 60 seconds after being withdrawn, the panels were subjected to a 60 second rinse with tap water. The panels were thereafter subjected to a reaction rinse (60 second immersion at 46–49° C.) before being cured in a convection oven (185° C., 40 minutes). Film builds (thicknesses) generally were about 1 mil.

The glossiness of the cured coatings thereby obtained (Table 4) was found to be dependent upon the amount of free isocyanate-containing crosslinking agent used. That is, as the quantity of DESMODUR N3400 was increased relative to the quantity of hydroxyl groups present in the autodeposition composition, the surface gloss decreased (compare in particular Examples 37, 40 and 43). These examples also demonstrate that the addition of a crosslinking agent containing blocked isocyanate groups but no free isocyanate groups (e.g., VESTAGON BF1540) generally does not have a significant effect on the surface gloss of the cured autodeposited coating.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Resin Solution[1] | 416.67 | 416.67 | 416.67 | 486.94 | 465.91 | 446.61 | 471.76 | 451.99 | 438.88 | 433.81 | 421.71 | 457.49 |
| Crosslinking Agent A[2] | 17.20 | 34.40 | 68.80 | 20.10 | 19.23 | 18.44 | 29.21 | 27.99 | 36.24 | 26.86 | 34.82 | 37.77 |
| Crosslinking Agent B[3] | — | — | — | — | 13.66 | 26.19 | — | 13.25 | 12.87 | 25.43 | 24.73 | –(0) |
| Coalescing Agent[4] | 17.37 | 18.49 | 20.72 | 20.30 | 20.31 | 20.32 | 20.30 | 20.31 | 20.31 | 20.32 | 20.32 | 20.30 |
| Solvent[5] | 221.78 | 246.78 | 296.79 | 259.18 | 267.79 | 275.69 | 265.26 | 273.35 | 278.59 | 280.80 | 285.63 | 270.96 |
| Catalyst[6] | 0.67 | 0.71 | 0.80 | 0.78 | 0.75 | 0.72 | 0.78 | 0.75 | 0.75 | 0.72 | 0.72 | 0.78 |
| Flow Agent[7] | 2.67 | 2.84 | 3.19 | 3.12 | 3.12 | 3.13 | 3.12 | 3.12 | 3.12 | 3.13 | 3.13 | 3.12 |
| Surfactant[8] | 13.06 | 13.90 | 15.58 | 15.26 | 15.27 | 15.28 | 15.26 | 15.27 | 15.27 | 15.28 | 15.28 | 15.26 |
| Deionized Water | 855.67 | 910.75 | 1020.92 | 1000 | 1000.44 | 1000.82 | 1000.00 | 1000.42 | 1000.41 | 1000.81 | 1000.78 | 1000.00 |
| NCO:OH Equiv. Ratio (total) | 0.125 | 0.250 | 0.500 | 0.125 | 0.1875 | 0.250 | 0.1875 | 0.250 | 0.3125 | 0.3125 | 0.375 | 0.250 |

[1]A 60% solution (40% volatiles) of the reaction product of bisphenol A diglycidyl ether, bisphenol A, and CARDOLITE NC-514 difunctional epoxy resin (derived from a phenol substituted with a long chain unsaturated hydrocarbon obtained from cashew oil, available from the Cardolite Corporation, Newark, New Jersey, USA). The reaction product, which had a WPE (weight per epoxide) value of 1650, and an OH equivalent weight of 350 was prepared as described in U.S. Ser. No. 09/578,935 filed May 25, 2000, and corresponding published PCT application WO 00/14528.
[2]DESMODUR N3400, an isocyanate-containing uretdione of hexamethylene diisocyanate available from Bayer, Pittsburgh, Pennsylvania, USA. Free NCO content = 21.80%
[3]VESTAGON BF1540, a caprolactam-blocked isophorone diisocyanate available from Creanova, effective isocyanate content = 15.35%
[4]TEXANOL,2,2,4-trimethyl-1,3-pentanediol monoisobutyrate, available from Eastman Chemical Company
[5]methyl isobutyl ketone
[6]dibutyltin oxide
[7]DISPARLON L-1984, an acrylic polymer-based leveling agent available from King Industries, Norwalk, Connecticut (100% non-volatiles)
[8]RHODAPEX CO-436, an ammonium salt of sulfonated nonylphenol ethyoxylate (58% active), available from Rhodia Chimie

TABLE 2

|  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| Resinous Dispersion |  |  |  |  |  |  |  |  |  |  |  |  |
| Example # | 1 | 2 | 3 | 4 | 5 | 6 | 7 | 8 | 9 | 10 | 11 | 12 |
| Weight, g | 794.4 | 813.9 | 800.1 | 867.6 | 841.8 | 866.9 | 863.9 | 900.1 | 908.1 | 881.9 | 903.6 | 942.2 |
| Deionized Water, g | 0 | 48.1 | 130.0 | 85.0 | 105.0 | 85.0 | 82.0 | 40.0 | 55.0 | 70.0 | 55.0 | 0 |
| AQUABLACK 255A[1], g | 19.1 | 20.7 | 22.3 | 23.2 | 23.1 | 23.2 | 23.1 | 23.0 | 23.5 | 23.2 | 23.4 | 23.0 |
| Particle Size, nm |  |  |  |  |  |  |  |  |  |  |  |  |
| Mean | 194 | 186 | 182 | 196 | 213 | 207 | 204 | 185 | 187 | 199 | 192 | 204 |
| Range | 153–242 | 142–259 | 140–255 | 148–269 | 163–297 | 158–288 | 156–252 | 129–236 | 131–238 | 153–279 | 151–240 | 157–285 |
| Diameter | 201.7 | 192.2 | 186.5 | 231.6 | 251.8 | 210.8 | 232.6 | 229.6 | 221.1 | 201.7 | 229.9 | 209.5 |
| Effective diameter | 200 | 192.8 | 186.2 | 216.5 | 230.5 | 211.2 | 214.3 | 205.3 | 203.1 | 200 | 207 | 215.5 |

[1]dispersion of carbon black pigment, available from the Binney and Smith Company

TABLE 3

|  | Ex. 25 | Ex. 26 | Ex. 27 | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|---|---|---|
| AUTOPHORETIC 300 Starter, g | 75.0 | 75.0 | 75.0 | 75.0 | 75.0 | 75.0 | 75.0 | 75.0 | 75.0 | 75.0 | 75.0 | 75.0 |
| Deionized Water, g | 1134.8 | 1134.7 | 1134.7 | 1138.1 | 1139.1 | 1139.5 | 1139.3 | 1139.6 | 1139.2 | 1139.0 | 1139.0 | 1139.7 |
| Replenisher Example | 13 | 14 | 15 | 16 | 17 | 18 | 19 | 20 | 22 | 24 | 21 | 23 |
| Replenisher, g | 290.2 | 290.3 | 290.3 | 286.1 | 285.9 | 285.5 | 285.7 | 285.4 | 285.8 | 286.0 | 286.0 | 285.3 |

TABLE 4

|  | Ex. 37 | Ex. 38 | Ex. 39 | Ex. 40 | Ex. 41 | Ex. 42 | Ex. 43 | Ex. 44 | Ex. 45 |
|---|---|---|---|---|---|---|---|---|---|
| Working Autodeposition Composition, Example # | 28 | 29 | 30 | 31 | 32 | 33 | 34 | 35 | 36 |
| Gloss, 60 Degree Gloss Units[1] | 95 | 94 | 93 | 21 | 50 | 57 | 7 | 8 | 8 |
| NCO:OH Equiv. Ratio (DESMODUR N3400 only) | 0.125 | 0.125 | 0.125 | 0.1875 | 0.1875 | 0.1875 | 0.250 | 0.250 | 0.250 |
| NCO:OH Equiv. Ratio (VESTAGON BF1540 only) | 0 | 0.0625 | 0.125 | 0 | 0.0625 | 0.125 | 0 | 0.0625 | 0.125 |
| NCO:OH Equiv. Ratio (total) | 0.125 | 0.1875 | 0.250 | 0.1875 | 0.250 | 0.3125 | 0.250 | 0.3125 | 0.375 |

[1]average of 4 panels

What is claimed is:

1. A cured autodeposited coating comprising the reaction product of:
   (a) a resin containing one or more epoxy groups and one or more hydroxy groups per molecule; and
   (b) one or more crosslinking agents, wherein at least one crosslinking agent contains two or more free isocyanate groups per molecule capable of reacting with the hydroxy groups of the resin at a first temperature and at least one crosslinking agent contains one or more functional groups per molecule capable of reacting with said resin only at a second temperature which is greater than the first temperature.

2. The cured autodeposited coating of claim 1 wherein said resin is prepared by reacting a glycidyl ether of a polyhydric phenol, a flexibilizing epoxy resin, and a chain extender containing at least two epoxy-reactive groups per molecule selected from hydroxyl, carboxylic acid, carboxylic acid anhydride, or combinations thereof.

3. The cured autodeposited coating of claim 2 wherein the polyhydric phenol is bisphenol A.

4. The cured autodeposited coating of claim 2 wherein the flexibilizing epoxy resin is a glycidyl ether derived from cardanol.

5. The cured autodeposited coating of claim 2 wherein the chain extender is a polyhydric phenol.

6. The cured autodeposited coating of claim 1 wherein the resin conforms to the chemical structure:

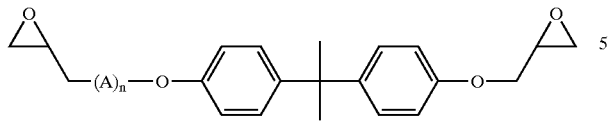

where: A =

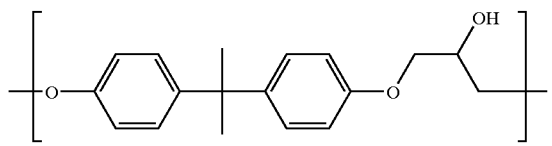

and "n" is an integer from 1 to 50.

7. The cured autodeposited coating of claim 1 wherein at least one of said functional groups capable of reacting with said resin only at a second temperature which is greater than the first temperature is a blocked isocyanate group.

8. The cured autodeposited coating of claim 1 wherein at least one crosslinking agent contains two or more blocked isocyanate groups per molecule.

9. The cured autodeposited coating of claim 1 wherein at least one crosslinking agent is selected from the group consisting of aliphatic and aromatic polylsocyanates.

10. The cured autodeposited coating of claim 1 wherein at least one crosslinking agent is selected from the group consisting of MDI, TDI, HMDI, isophorone disocyanate, cyclohexane diisocyanate and mixtures thereof.

11. The cured autodeposited coating of claim 1 wherein at least one of the functional groups capable of reacting with said resin only at a second temperature which is greater than the first temperature is selected from the group consisting of amine, amide, imine, thiol, hydroxyl, carboxyl, carboxylic acid anhydride and combinations thereof.

12. The cured autodeposited coating of claim 1 wherein at least one of said crosslinking agents has the structure:

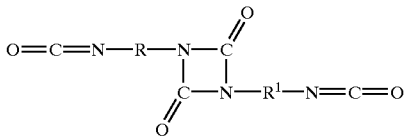

wherein R and R$^1$ are independently selected from aliphatic, cycloaliphatic, alkylaromatic or aromatic radicals.

13. The cured autodeposition coating of claim 1 wherein at least one of said crosslinking agents has a uretdione structure.

14. The cured autodeposition coating of claim 1 wherein at least one of said crosslinking agents is prepared by dimerization or trimerization of a polyisocyanate.

15. The cured autodeposition coating of claim 1 wherein at least one of said crosslinking agents is an isocyanete-containing uretdione.

16. The cured autodeposited coating of claim 1 in combination with a metallic substrate.

17. The cured autodeposited coating of claim 1 having a thickness of from about 5 to 50 microns.

18. An autodeposition composition comprising:
 a. water;
 b. a reactive prepolymer which comprises a reaction product of (i) a resin containing at least one epoxy group and at least one hydroxyl group reactive with a free isocyanate group at a first temperature, and (ii) a low temperature crosslinking agent containing free isocyanate groups reactive with said hydroxyl group at said first temperature; and
 c. a high temperature crosslinking agent capable of reacting with said reactive prepolymer only at a second temperature which is higher the first temperature.

19. The autodeposition composition of claim 18 wherein said resin is prepared by reacting an epoxy resin which is a diglycidyl ether of a polyhydric phenol, a flexibilizing epoxy resin, and a chain extender containing at least two epoxy reactive groups selected from hydroxy), carboxylic acid, carboxylic acid anhydride and combinations thereof.

20. The autodeposition composition of claim 19 wherein the epoxy resin is glycidyl ether of bisphenol A.

21. The autodeposition composition of claim 19 wherein the flexibilizing epoxy resin is a glycidyl ether derived from cardanol.

22. The autodeposition composition of claim 19 wherein the chain extender is a polyhydric phenol.

23. The autodeposition composition of claim 18 wherein the resin is an epoxy resin conforming to the general chemical structure:

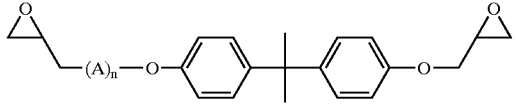

where:

A =

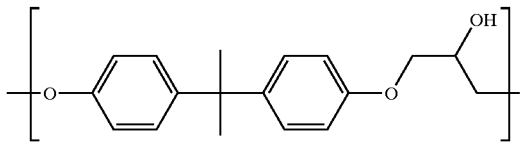

and "n" Is an Integer from 1 to 50.

24. The autodeposition composition of claim 19 additionally comprising at least one further component selected from the group consisting of emulsifying agents, accelerators, colorants, coalescing solvents, leveling agents, and combinations thereof.

25. The autodeposition composition of claim 18 wherein the low temperature crosslinking agent is selected from the group consisting of MDI, TDI, HMDI, isophorone dsisocyanate, cyclohexane dilsocyanate and mixtures thereof.

26. The autodeposition composition of claim 18 wherein the high temperature crosslinking agent contains one or more blocked isocyanate groups.

27. The autodeposition composition of claim 18 wherein said reactive prepolymer and said high temperature crosslinking agent are in emulsified or dispersed form.

28. A metallic substrate coated by the autodeposition composition of claim 18.

29. A method of forming a coating on a metallic substrate, said method comprising contacting the metallic substrate with the autodeposition composition of claim 18 for a time effective to form a layer comprised of the reactive prepolymer and the high temperature crosslinking agent on the metallic substrate and curing said layer to form said coating.

30. The method of claim 29 wherein said autodeposition composition is additionally comprised of an accelerator.

31. The method of claim 29 wherein said curing is performed at a temperature of between about 130° C. and 240° C.

* * * * *

UNITED STATES PATENT AND TRADEMARK OFFICE
CERTIFICATE OF CORRECTION

PATENT NO. : 6,723,765 B2
DATED : April 20, 2004
INVENTOR(S) : Bammel

It is certified that error appears in the above-identified patent and that said Letters Patent is hereby corrected as shown below:

Column 17,
Line 27, delete "polylsocyanates" and insert -- polyisocyanates --.
Line 56, delete "isocyanete" and insert -- isocyanate --.

Column 18,
Line 11, delete "hydroxy)" and insert -- hydroxyl --.
Line 38, delete "Is" and insert -- is --.
Line 46, delete "dsisocyanate" and "dilsocyanate" and insert -- diisocyanate -- (both instances).

Signed and Sealed this

Second Day of May, 2006

JON W. DUDAS
*Director of the United States Patent and Trademark Office*

UNITED STATES PATENT AND TRADEMARK OFFICE
CERTIFICATE OF CORRECTION

PATENT NO.   : 6,723,765 B2
DATED        : April 20, 2004
INVENTOR(S)  : Bammel

It is certified that error appears in the above-identified patent and that said Letters Patent is hereby corrected as shown below:

<u>Title page,</u>
Item [56], References Cited, U.S. PATENT DOCUMENTS, add the following:
-- 3,592,699   7/1971    Steinbrecher et al.   148/6.2
   4,108,817   8/1978    Lochel Jr.            260/,29.6E
   4,178,400   12/1979   Lochel Jr.            427/435
   4,180,603   12/1979   Howell Jr.            427/353
   4,242,379   12/1980   Hall et al.           427/327
   4,243,704   1/1981    Hall et al.           427/327
   4,289,826   3/1981    Howell Jr.            428/418
   4,859,721   8/1989    Oberkobusch et al.    523/402
   4,929,724   5/1990    Engbert et al.        540/202
   5,342,694   8/1994    Ahmed et al.          428/461
   5,500,460   3/1996    Ahmed et al.          523/402
   6,096,806   8/2000    Mueller et al.        523/402 --.
FOREIGN PATENT DOCUMENTS, add the following:
-- EP   921140 Al          6/1999
   JP   6397226 A          4/1998
   WO   WO 00/71337 Al     11/2000 --.

<u>Column 17,</u>
Line 27, delete "polylsocyanates" and insert -- polyisocyanates --.
Line 56, delete "isocyanete" and insert -- isocyanate --.

UNITED STATES PATENT AND TRADEMARK OFFICE
CERTIFICATE OF CORRECTION

PATENT NO. : 6,723,765 B2
DATED : April 20, 2004
INVENTOR(S) : Bammel

It is certified that error appears in the above-identified patent and that said Letters Patent is hereby corrected as shown below:

<u>Column 18,</u>
Line 11, delete "hydroxy)" and insert -- hydroxyl --.
Line 38, delete "Is" and insert -- is --.
Line 46, delete "dsisocyanate" and "dilsocyanate" and insert in both instances
-- diisocyanate --.

Signed and Sealed this

Sixth Day of June, 2006

JON W. DUDAS
*Director of the United States Patent and Trademark Office*